US012697976B2

(12) United States Patent
     Aoyama

(10) Patent No.:    US 12,697,976 B2
(45) Date of Patent:         Aug. 4, 2026

(54) OCCUPANT MONITORING APPARATUS FOR VEHICLE

(71) Applicant: SUBARU CORPORATION, Tokyo (JP)

(72) Inventor: Yuki Aoyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 57 days.

(21) Appl. No.: 18/895,704

(22) Filed: Sep. 25, 2024

(65)          Prior Publication Data

US 2025/0115246 A1      Apr. 10, 2025

(30)      Foreign Application Priority Data

Oct. 4, 2023     (JP) ................................. 2023-172925

(51) Int. Cl.
     *B60W 30/18*          (2012.01)
     *B60W 10/188*         (2012.01)
     *B60W 10/20*          (2006.01)
     *B60W 50/10*          (2012.01)
     *B60W 50/14*          (2020.01)
(52) U.S. Cl.
     CPC .... *B60W 30/18163* (2013.01); *B60W 10/188* (2013.01); *B60W 10/20* (2013.01); *B60W 50/10* (2013.01); *B60W 50/14* (2013.01); *B60W 2420/403* (2013.01); *B60W 2520/10* (2013.01); *B60W 2540/221* (2020.02); *B60W 2540/225* (2020.02)
(58) Field of Classification Search
     CPC .... B60W 10/18; B60W 10/188; B60W 10/20;

B60W 30/025; B60W 30/18163; B60W 40/08; B60W 2040/0818; B60W 50/10; B60W 50/14; B60W 2050/143; B60W 2420/403; B60W 2520/10; B60W 2540/22; B60W 2540/223; B60W 2540/225; B60W 2540/229; B60W 2540/221; G06V 20/59; G06V 20/597; G05D 1/86
     See application file for complete search history.

(56)          References Cited

U.S. PATENT DOCUMENTS 11,383,730 B2 *  7/2022  Marberger ............ B60W 10/18
2020/0239007 A1 *  7/2020  Sobhany .............. G05D 1/0061
                      (Continued)

FOREIGN PATENT DOCUMENTS

JP          2014-89589 A       5/2014

*Primary Examiner* — Brandon Z Willis
(74) *Attorney, Agent, or Firm* — Rimon P.C.

(57)          ABSTRACT

An occupant monitoring apparatus for a vehicle includes an imager and an occupant monitoring controller. The imager is configured to acquire an image of a driver who drives the vehicle. The occupant monitoring controller includes a behavior change detector and an alarm outputter. The behavior change detector is configured to perform a detection of a change in a behavior of the driver based on the image acquired by the imager. The alarm outputter is configured to output predetermined alarm information based on a result of the detection performed by the behavior change detector. The behavior change detector is configured to set detection duration time based on which the change in the behavior of the driver is detected, depending on a traveling speed of the vehicle and a type of a driving assistance control that is in execution of the vehicle.

9 Claims, 4 Drawing Sheets

(56)               References Cited

U.S. PATENT DOCUMENTS

| | | | |
|---|---|---|---|
| 2020/0282984 A1* | 9/2020 | Mizoguchi | B60W 60/005 |
| 2021/0261050 A1* | 8/2021 | Sobhany | B60Q 3/80 |
| 2022/0234607 A1* | 7/2022 | Hata | B60W 40/08 |
| 2023/0278565 A1* | 9/2023 | Okabe | B60W 40/09 |
| | | | 701/1 |
| 2025/0018968 A1* | 1/2025 | Sano | B60W 40/08 |

* cited by examiner

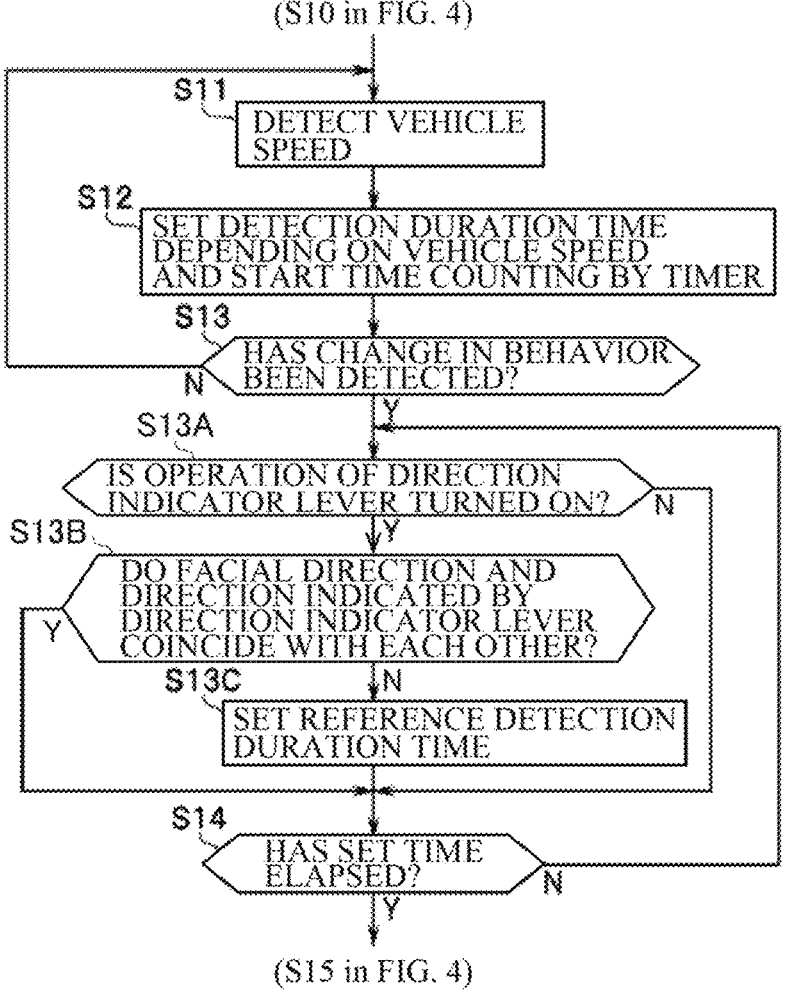

(S10 in FIG. 4)

S11 — DETECT VEHICLE SPEED

S12 — SET DETECTION DURATION TIME DEPENDING ON VEHICLE SPEED AND START TIME COUNTING BY TIMER

S13 — HAS CHANGE IN BEHAVIOR BEEN DETECTED? N / Y

S13A — IS OPERATION OF DIRECTION INDICATOR LEVER TURNED ON? N / Y

S13B — DO FACIAL DIRECTION AND DIRECTION INDICATED BY DIRECTION INDICATOR LEVER COINCIDE WITH EACH OTHER? Y / N

S13C — SET REFERENCE DETECTION DURATION TIME

S14 — HAS SET TIME ELAPSED? N / Y (S15 in FIG. 4)

FIG. 5

OCCUPANT MONITORING APPARATUS FOR VEHICLE

CROSS-REFERENCE TO RELATED APPLICATIONS

The present application claims priority from Japanese Patent Application No. 2023-172925 filed on Oct. 4, 2023, the entire contents of which are hereby incorporated by reference.

BACKGROUND

The disclosure relates to an occupant monitoring apparatus for a vehicle.

In recent years, an occupant monitoring apparatus has been put into practical use in a vehicle such as an automobile. The occupant monitoring apparatus is configured to monitor faces or behaviors of occupants including a driver who drives the vehicle using, for example, an imaging device such as a camera. Upon recognition of, for example, inattentiveness or dozing of the driver, the occupant monitoring apparatus is configured to issue a predetermined alarm. Mounting such an occupant monitoring apparatus on the vehicle enables the driver, for example, to concentrate on driving of the vehicle. This makes it possible to perform safety operation of the vehicle.

In general, it has been found that, the higher a vehicle speed is, the shorter a period of time until occurrence of an accident becomes that is caused by inattentiveness or dozing, for example. Accordingly, in the occupant monitoring apparatus of this kind, a period of time until determination that the driver is inattentive, for example, is to be set shorter as the vehicle speed becomes higher. The determination is made based on a result of recognition of a behavior, for example, of the driver. However, frequent issuance of an alarm at the same timing as a timing during high-speed traveling even in the case of low vehicle speed may make the driver feel annoying.

Thus, various techniques in devising the timing of issuing a warning, for example, depending on circumstances have been proposed for existing occupant monitoring apparatuses. For example, reference is made to Japanese Unexamined Patent Application Publication (JP-A) No. 2014-89589.

An occupant monitoring apparatus disclosed in JP-A No. 2014-89589, for example, changes the timing of issuing an alarm at the time when inattentiveness or dozing, for example, of the driver is detected, depending on a distance to a preceding vehicle or a vehicle speed of an own vehicle, for example. This makes it possible to suppress the frequent issuance of an alarm.

Meanwhile, in recent years, various driving assistance control devices have been proposed and being put into practical use for a vehicle such as an automobile. The driving assistance control devices perform a control to assist multiple driving operations to be performed by the driver, for the purpose of reducing the load of a driving operation performed by the driver and improving safety during traveling of the vehicle.

In general, during execution of the driving assistance control, the driver has reduced load of driving. Accordingly, at this time, the driver is able to afford to monitor circumstances of a wider field-of-view range.

SUMMARY

An aspect of the disclosure provides an occupant monitoring apparatus for a vehicle. The occupant monitoring apparatus for the vehicle includes an imager and an occupant monitoring controller. The imager is configured to acquire an image of a driver who drives the vehicle. The occupant monitoring controller includes a behavior change detector and an alarm outputter. The behavior change detector is configured to perform a detection of a change in a behavior of the driver based on the image acquired by the imager. The alarm outputter is configured to output predetermined alarm information based on a result of the detection performed by the behavior change detector. The behavior change detector is configured to set detection duration time based on which the change in the behavior of the driver is detected, depending on a traveling speed of the vehicle and a type of a driving assistance control that is in execution of the vehicle.

An aspect of the disclosure provides an occupant monitoring apparatus for a vehicle. The occupant monitoring apparatus for the vehicle includes circuitry. The circuitry is configured to acquire an image of a driver who drives the vehicle, perform a detection of a change in a behavior of the driver based on the acquired image, output predetermined alarm information based on a result of the detection of the change in the behavior, and set, upon the detection of the change in the behavior, detection duration time based on which the change in the behavior of the driver is detected, depending on a traveling speed of the vehicle and a type of a driving assistance control that is in execution of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is a flowchart illustrating some of operations of an occupant monitoring apparatus according to one example embodiment of the disclosure.

DETAILED DESCRIPTION

Figure 1:
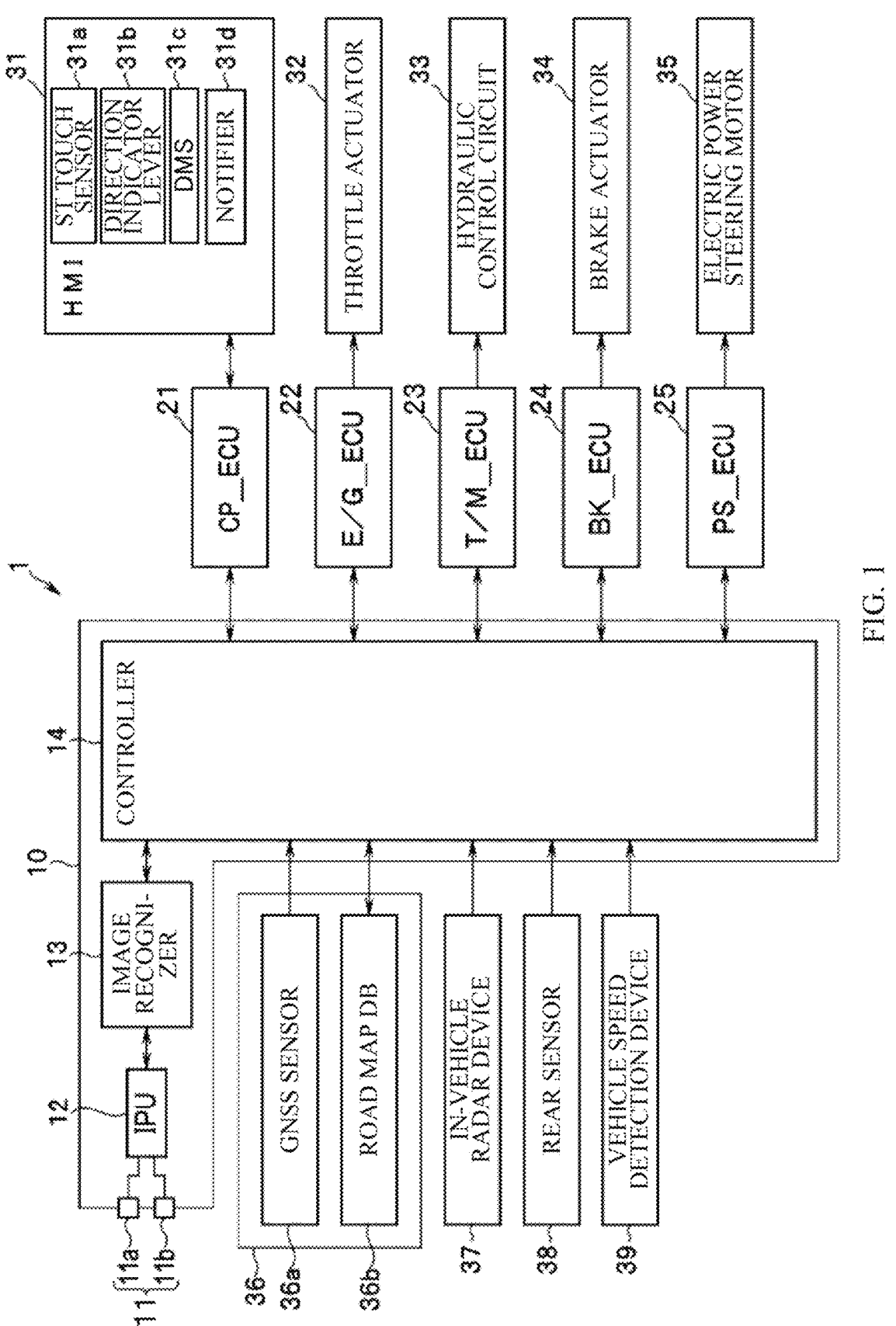
FIG. 1 is a block configuration diagram illustrating a schematic configuration of a vehicle mounted with an occupant monitoring apparatus according to one example embodiment of the disclosure.

There is a possibility that a behavior performed by a driver who drives a vehicle to monitor surrounding circumstances may be mistakenly recognized as inattentiveness, for example, by an existing occupant monitoring apparatus. In this case, the occupant monitoring apparatus ends up frequently issuing an unnecessary alarm. Then, also in this case, the frequent issuance makes the driver feel annoying. Further, when the unnecessary alarm is issued, driver's attention may end up being directed to a source of the alarm, which may possibly narrow a field of view of the driver. Accordingly, the safety of the vehicle might possibly be harmed in this case.

In an existing occupant monitoring apparatus disclosed in JP-A No. 2014-89589, for example, no consideration is given to a control during a driving assistance control, leading to a possibility that the above-described issues may occur.

It is desirable, in a vehicle mounted with a driving assistance control device and an occupant monitoring apparatus, to provide the occupant monitoring apparatus for the vehicle which makes it possible for the occupant monitoring apparatus to suppress, during traveling of the vehicle, frequent issuance of an unnecessary alarm and to contribute to an improvement in safety at the time of the traveling of the vehicle.

In the following, some example embodiments of the disclosure are described in detail with reference to the accompanying drawings.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Before describing, in detail, an occupant monitoring apparatus of a first example embodiment of the disclosure, a description is given below of a schematic configuration of a vehicle mounted with the occupant monitoring apparatus with reference to FIG. 1. FIG. 1 is a block configuration diagram illustrating a schematic configuration of the vehicle mounted with the occupant monitoring apparatus according to the first example embodiment of the disclosure.

FIG. 1 illustrates components directly related to the disclosure; other components are considered to have configurations substantially similar to those of an existing vehicle of a similar kind, and thus illustration thereof is omitted. Hereinafter, a description is given of the components directly related to the disclosure.

As illustrated in FIG. 1, a vehicle 1 mounted with the occupant monitoring apparatus, which is denoted as DMS in FIG. 1; see a reference numeral 31c, according to the example embodiment may include a driving assistance control device, i.e., a camera unit 10 described later in detail, a vehicle speed detection device 39, an occupant monitoring apparatus, i.e., the DMS 31c, and a notifier 31d.

The driving assistance control device may be a device and a configuration unit. The device and the configuration unit may selectively execute multiple types of driving assistance controls that assist a driving operation of the vehicle 1, or may simultaneously execute some of the driving assistance controls. To this end, the driving assistance control device may assist driving operations of an accelerator, a brake, i.e., a braking device, and a steering, i.e., a steering device, among components that perform driving operations of the vehicle 1, to perform, for example, acceleration and deceleration controls and a steering control of the vehicle 1.

The driving assistance control device may set, for example, multiple driving modes:

(1) a manual driving mode that involves intervention of a notification or a warning, which is abbreviated hereinafter as assist notification, for a driving assistance at a predetermined timing in a predetermined case during execution of acceleration and deceleration as well as steering, for example, by a driver voluntarily performing various driving operations, such as operations of an accelerator, a brake, and a steering;

(2) an assisted driving mode in which a driving assistance control such as the acceleration and deceleration controls and the steering assistance control intervene at a predetermined timing in a predetermined case while assuming a voluntary driving operation by the driver; and (3) an automated driving mode that executes a control to cause the vehicle 1 to automatically travel without involving a driving operation of the driver.

These multiple driving modes may be set optionally and selectively by the driver. Note that the driving assistance control device may not necessarily be provided with the automated driving mode in the above-described item (3).

Non-limiting examples of the driving assistance control to be executed in such multiple driving modes may include:

(A) a first driving assistance control that performs acceleration and deceleration controls;

(B) a second driving assistance control that performs the acceleration and deceleration controls and a steering control at a steering angle smaller than a predetermined steering angle; and (C) a third driving assistance control that performs the acceleration and deceleration controls and a steering control at a steering angle equal to or larger than the predetermined steering angle.

These multiple driving assistance controls may also be set optionally and selectively by the driver, or several driving assistance controls may be set at the same time.

In one embodiment;

(A1) an adaptive cruise control (ACC) may serve as a first driving assistance;

(A2) an active lane keep centering control (ALKC) may serve as a second driving assistance control; and (A3) an auto lane changing control (ALC) may serve as a third driving assistance control.

Note that the phrase "an angle smaller than a predetermined steering angle" in the above-described item (B) may be, for example, a steering angle to be kept not to allow the vehicle 1 during traveling to deviate from an own vehicle lane. The phrase "an angle equal to or larger than the predetermined steering angle" in the above-described item (C) may be, for example, a steering angle to be kept at the time when the vehicle 1 during traveling changes lanes from an own vehicle lane to an adjacent vehicle lane.

These first to third driving assistance controls may be executed at a predetermined timing in a predetermined case, to thereby enable the vehicle 1 to travel automatically and stably along a predetermined traveling lane while maintaining an inter-vehicular distance between the vehicle 1 and a preceding vehicle.

In a normal case, for example, the following settings:

(a) setting to perform only the first driving assistance control (ACC);

(b) simultaneous setting of the first driving assistance control and the second driving assistance control (ACC+ALKC);

(c) simultaneous setting of the first driving assistance control and the third driving assistance control (ACC+ALC); and (d) simultaneous setting of the first driving assistance control, the second driving assistance control, and the third driving assistance control (ACC+ALKC+ALC) may be often used.

In the setting of the above-described item (a), a control may be performed that causes the vehicle 1 to keep traveling to follow the preceding vehicle while maintaining the inter-vehicular distance between the vehicle 1 and the preceding vehicle.

In the setting of the above-described item (b), a control may be performed that causes the vehicle 1 to keep traveling along a predetermined traveling lane while following the preceding vehicle and maintaining the inter-vehicular distance between the vehicle 1 and the preceding vehicle.

In the setting of the above-described item (c), the auto lane changing control may be performed that causes the vehicle 1 to change lanes from a lane in which the vehicle 1 is traveling to an adjacent lane at a timing of reception of a lane change command signal, during traveling to follow the preceding vehicle while maintaining the inter-vehicular distance between the vehicle 1 and the preceding vehicle. In this case, the lane change command signal may be, for example, a signal to be outputted by a driver operating a direction indicator lever 31*b*. Reference is made to FIG. 1 for the direction indicator lever 31*b*.

In the setting of the above-described item (d), the auto lane changing control may be performed that causes the vehicle 1 to change lanes from a lane in which the vehicle 1 is traveling to an adjacent lane at a timing of reception of the lane change command signal, when causing the vehicle 1 to keep traveling along a predetermined traveling lane while following the preceding vehicle and maintaining the inter-vehicular distance between the vehicle 1 and the preceding vehicle.

In some embodiments, the driving assistance control device may be an in-vehicle camera device, i.e., the camera unit 10 including a stereo camera 11 fixed to the middle of a front upper part in an unillustrated vehicle compartment of the vehicle 1.

As illustrated in FIG. 1, the camera unit 10 may include the stereo camera 11, an image processor 12, which is referred to as "IPU" in FIG. 1, an image recognizer 13, a controller 14, for example.

The stereo camera 11 may include two cameras, i.e., a main camera 11*a* and a sub camera 11*b*. The main camera 11*a* and the sub camera 11*b* may be, for example, disposed toward the front of the vehicle 1, at symmetrical positions with respect to a midpoint in a vehicle-width direction in the vehicle compartment of the vehicle 1. The main camera 11*a* and the sub camera 11*b* may each include, for example, an imaging optical system, an imaging element such as a CMOS image sensor, and a processing circuit that processes an imaging signal, for example. Note that illustration of the detailed configuration is omitted.

With such a configuration, the stereo camera 11 may cause the main camera 11*a* and the sub camera 11*b* to acquire two pieces of image data from two different viewpoints that target a surrounding environment of a predetermined range outside and ahead of the vehicle 1 at a predetermined imaging cycle synchronized with each other. Then, stereo image data may be generated based on the two pieces of image data acquired in this manner. The stereo image data may be surrounding environment data that represents a surrounding environment during traveling of the vehicle 1. The surrounding environment data, i.e., image data generated by the stereo camera 11 may be outputted to the image processor 12.

The image processor 12 may be a configuration unit or a circuit unit that performs predetermined image processing on the surrounding environment data, i.e., image data representing the surrounding environment during the traveling of the vehicle 1 acquired by the stereo camera 11. The image processor 12 may perform, for example, processing to detect an edge of various targets, i.e., an object or lane lines displayed on the image.

The image processor 12 may acquire distance data based on an amount of a position shift of a corresponding edge on right and left images based on the stereo image data, and may generate image data, i.e., distance image data including the distance data. The distance image data, for example, generated by the image processor 12 may be outputted to the image recognizer 13.

Based on the distance image data, for example, inputted from the image processor 12, the image recognizer 13 may calculate a road curvature [1/m] of each of right and left lane lines of a traveling route along which the vehicle 1 travels, i.e., an own-vehicle traveling route, and a width, i.e., a lane width between the right and left lane lines. Various well-known methods may be used to determine the road curvature and the lane width.

Based on the distance image data acquired by the stereo camera 11, the image recognizer 13 may perform predetermined pattern matching, for example, to recognize, for example, a three-dimensional object extending along the road, a parking space indication line marked by a division line, for example, on a road surface inside premises such as a parking space, a three-dimensional structure such as a parking block that sets a parking zone region, or a gap space with respect to another adjacent vehicle. Non-limiting examples of the three-dimensional object extending along the road may include a guardrail, a curbstone, and other surrounding vehicles.

In recognizing the three-dimensional object, i.e., in object recognition, the image recognizer 13 may recognize, for example, a type of the three-dimensional object, a height of the three-dimensional object, a width dimension of the three-dimensional object, a distance from the vehicle 1 to the three-dimensional object, a moving speed of the three-dimensional object, a relative speed between the three-dimensional object and the vehicle 1, and a relative distance between three-dimensional objects. Non-limiting examples of the relative distance between three-dimensional objects may include a lateral distance between a curbstone at a road edge and a division line near the curbstone.

The various pieces of data recognized by the image recognizer 13 may be outputted as the surrounding environment data to the controller 14. In this case, the camera unit 10 including the image recognizer 13 may serves as a surrounding environment recognition device that recognizes a surrounding environment of the vehicle 1.

The controller 14 included in the camera unit 10 may be a configuration unit or a circuit unit that controls the camera unit 10 and controls the entire driving assistance control device to centrally perform a driving assistance control of the vehicle 1 mounted with the driving assistance control device.

The controller 14 may be coupled, through an in-vehicle communication line such as a controller area network (CAN), for example, to various control units, for example, a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25.

The CP_ECU 21 may be coupled to a human-machine interface 31, which is referred to as "HMI" in FIG. 1, provided around a driver's seat. The HMI 31 may include a notifier 31*d*, for example, in addition to the various operation members and various sensing devices.

Here, non-limiting examples of the various operation members may include, for example, the direction indicator lever 31*b* to issue a lane change command signal, in addition to an operation switch, a driving mode switching switch, and multiple operation switches. The operation switch may instruct activation or stopping of the occupant monitoring apparatus, i.e., the DMS 31*c*. The driving mode switching switch may select a driving mode or switch driving modes. The multiple operation switches may instruct activation or stopping of the driving assistance control. Note that these switches are unillustrated.

The multiple driving modes may include, for example, the manual driving mode, the assisted driving mode, and the automated driving mode. The manual driving mode may involve assist notification. The assisted driving mode may perform a driving assistance control by intervening in some of driving operations at a predetermined timing in a predetermined case. The automated driving mode may perform an automated driving control by intervening in all of the driving operations during traveling of the vehicle 1. Note that the automated driving mode may not necessarily be included.

Examples of the various sensing devices may include, for example, a steering touch sensor 31*a*, which is denoted as an ST touch sensor in FIG. 1), and a driver monitoring system 31*c*, which is hereinafter abbreviated as the DMS). The driver monitoring system 31*c* may be the occupant monitoring apparatus. The steering touch sensor 31*a* may be a sensing device that detects a driver's holding state of a steering wheel.

The DMS 31*c* may be a configuration unit, a circuit unit, or a sensing device that monitors a driver who drives the vehicle 1, detects a change in a behavior of the driver, and outputs predetermined alarm information, for example, at a predetermined timing in response to a result of the detection. The DMS 31*c* may be configured as an in-vehicle monitor system including, for example, an in-vehicle camera. The DMS 31*c* may be activated or stopped by optionally operating a predetermined operation switch.

As used herein, the "change in the behavior of the driver" may be, for example, a change in the facial direction, a change in the line-of-sight direction, a change in the degree of eye opening, and a change in the facial expression. The DMS 31*c* may detect, for example, a change in a posture, i.e., a postural off-balance, a decreased arousal level, such as a change in the degree of eye opening, by continuously monitoring the behaviors of the driver. The DMS 31*c*, which is a non-limiting example of the occupant monitoring apparatus, may also detect, for example, a boarding status of occupants including the driver.

Figure 2:
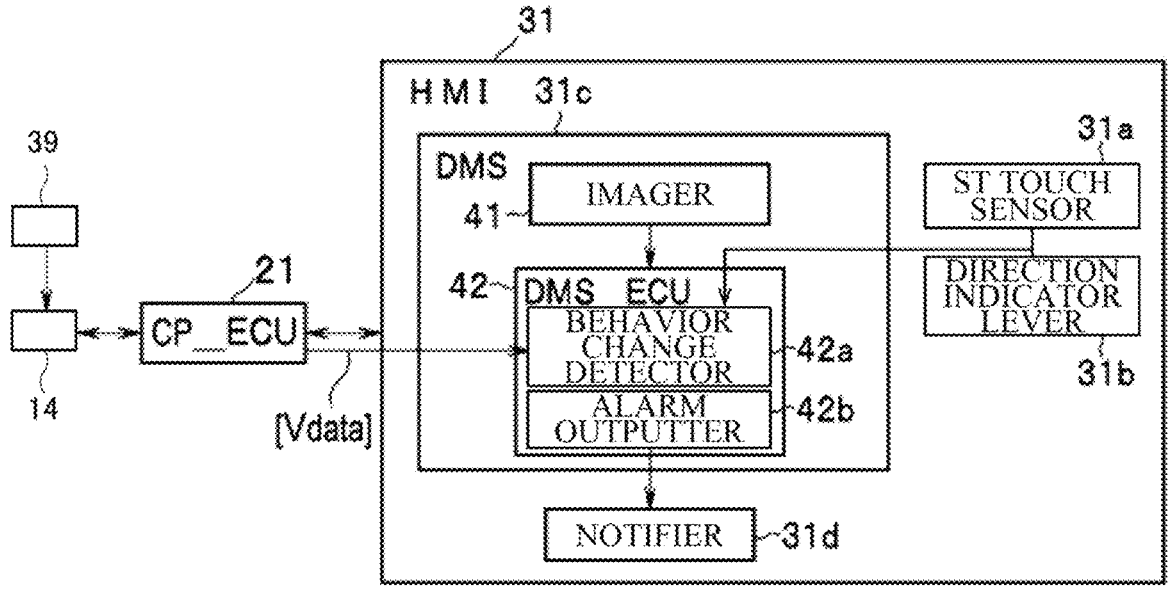
FIG. 2 is a block configuration diagram conceptually illustrating an outline of a configuration of the occupant monitoring apparatus illustrated in FIG. 1.

Now, a description is given of a configuration of the DMS 31*c* which is a non-limiting example of the occupant monitoring apparatus according to the example embodiment with reference to FIG. 2. FIG. 2 is a block configuration diagram conceptually illustrating an outline of the configuration of the DMS 31*c* which is a non-limiting example of the occupant monitoring apparatus according to the example embodiment.

The DMS 31*c* may include an imager 41 and DMS_ECU 42. The imager 41 may acquire images of the occupants including the driver who drives the vehicle 1, and may perform predetermined image processing on the acquired images to output the images to the DMS_ECU 42.

The DMS_ECU 42 may be an occupant monitoring control unit that controls the DMS 31*c*. The DMS_ECU 42 may be a configuration unit or a circuit unit including, for example, an electronic control unit (ECU). The DMS_ECU 42 may include a behavior change detector 42*a* and an alarm outputter 42*b*.

The behavior change detector 42*a* may be a configuration unit or a circuit unit that detects a change in the behavior, for example, of the driver based on, for example, an image acquired by the imager 41, or an output, for example, from another sensing device or various operation members. Non-limiting examples of the sensing device may include the ST touch sensor 31*a*, and non-limiting examples of the various operation members may include the direction indicator lever 31*b*. The behavior change detector 42*a* may detect the boarding status of the occupants including the driver. Further, the behavior change detector 42*a* may also perform, for example, personal recognition by performing facial recognition of the driver.

The alarm outputter 42*b* may be a configuration unit or a circuit unit that outputs a predetermined alarm information signal to the notifier 31*d* based on a result of the detection made by the behavior change detector 42*a*.

The notifier 31*d* may be a device that notifies the driver of a predetermined alarm corresponding to the alarm information outputted from the occupant monitoring apparatus, i.e., the DMS 31*c* in a predetermined form, i.e., in visual indication or auditory indication. The notifier 31*d* may include, for example, a touch panel display, i.e., a visual indicator, a sound outputter, i.e., an auditory indicator including a speaker, and a combination meter combining various instruments.

The CP_ECU 21 may be a configuration unit or a circuit unit that, upon reception of a control signal from the controller 14, appropriately notifies the driver of various pieces of information in a predetermined form, i.e., in visual indication or auditory indication using the notifier 31*d* included in the HMI 31.

Non-limiting examples of the various pieces of information to be notified using the notifier 31*d* may include various pieces of alarm information, an implementation status of the driving assistance control, and various pieces of information related to, for example, the surrounding environment of the vehicle 1. In addition, the notifier 31*d* may receive, for example, an alarm information signal outputted from the alarm outputter 42*b* to notify the driver of a predetermined alerting warning, for example.

The CP_ECU 21 may output, to the controller 14, various pieces of input information such as instruction signals inputted by the driver using various operation members included in the HMI 31. Non-limiting examples of the inputted instruction signals may include an on/off instruction of various driving assistance controls, switching or selection instruction of the traveling mode.

The E/G_ECU 22 may have an output side coupled to, for example, a throttle actuator 32 of an electronic control throttle. In addition, the E/G_ECU 22 may have an input side coupled to various sensors such as an accelerator sensor.

The E/G_ECU 22 may be a configuration unit or a circuit unit, or a driving device that drives and controls the throttle actuator 32 to generate a driving force for the vehicle 1, based on, for example, a control signal from the controller 14 or a detection signal from the various sensors. The E/G_ECU 22 may thus adjust an intake air amount of an engine to generate a desired engine output. In addition, the E/G_ECU 22 may output, to the controller 14, a signal indicating an accelerator position, for example, detected by the various sensors, such as an acceleration sensor.

The T/M_ECU 23 may have an output side coupled to a hydraulic control circuit 33. In addition, the T/M_ECU 23 may have an input side coupled to the various sensors such as an unillustrated shift position sensor.

The T/M_ECU 23 may be a configuration unit or a circuit unit that performs hydraulic control for the hydraulic control circuit 33 based on, for example, an engine torque signal estimated by the E/G_ECU 22 or a detection signal from the various sensors. The T/M_ECU 23 may thus operate a part such as a friction engagement member or a pulley provided in an automatic transmission, to perform shifting of the engine output at a desired shifting ratio. In addition, the T/M_ECU 23 may output, to the controller 14, a signal indicating a shift position, for example, detected by the various sensors.

The BK_ECU 24 may have an output side coupled to a brake actuator 34. The brake actuator 34 may adjust a brake fluid pressure to be applied to a brake wheel cylinder provided on each wheel. In addition, the BK_ECU 24 may have an input side coupled to unillustrated various sensors, such as a brake pedal sensor, a yaw rate sensor, a longitudinal acceleration sensor, and a vehicle speed sensor, which are unillustrated.

The BK_ECU 24 may be a configuration unit or a circuit unit, or a braking device that drives and controls the brake actuator 34 to perform a braking control on the vehicle 1, based on a control signal from the controller 14 or a detection signal from the various sensors. The BK_ECU 24 may thus generate, as appropriate on each wheel, a braking force to be used to perform a forcible braking control or a yaw rate control, for example, for the vehicle 1. In addition, the BK_ECU 24 may output, to the controller 14, signals indicating a brake operation state, a yaw rate, a longitudinal acceleration rate, and a vehicle speed, for example, detected by the various sensors.

The PS_ECU 25 may have an output side coupled to an electric power steering motor 35. The electric power steering motor 35 may impart a steering torque to a steering mechanism using a rotary power of the motor. In addition, the PS_ECU 25 may have an input side coupled to unillustrated various sensors such as a steering torque sensor and a steering angle sensor.

The PS_ECU 25 may be a configuration unit or a circuit unit, or a steering device that drives and controls the electric power steering motor 35 to perform a steering control on the vehicle 1, based on a control signal from the controller 14 or a detection signal from the various sensors. The PS_ECU 25 may thus generate the steering torque for the steering mechanism. In addition, the PS_ECU 25 may output, to the controller 14, signals indicating the steering torque and a steering angle, for example, detected by the various sensors.

The controller 14 may be coupled to various sensors such as, for example, a locator unit 36, an in-vehicle radar device 37, a rear sensor 38, and the vehicle speed detection device 39. The locator unit 36 may include a global navigation satellite system (GNSS) sensor 36a and a high-precision road map database (road map DB) 36b.

The GNSS sensor 36a may receive positioning signals from multiple positioning satellites to thereby measure a position, such as a latitude, a longitude, and an altitude, of the vehicle 1.

The road map DB 36b may be a large-capacity storage medium such as a hard disk drive (HDD) or a solid state drive (SSD). The road map DB 36b may store high-precision three-dimensional road map information, i.e., a dynamic map.

The road map DB 36b may hold, for example, lane data to be desired in performing automated driving. Examples of the lane data may include lane width data, lane middle position coordinate data, lane forward azimuth angle data, and speed limit data. The lane data may be held at intervals of several meters, in each lane on the road map. Further, the road map DB 36b may also contain dynamic data on accidents or congestions, for example, that change from time to time and moment to moment, in addition to data on traffic regulation and road construction.

The locator unit 36 may be able to acquire real-time surrounding environment data at an own vehicle position measured by the GNSS sensor 36a, by communicating with an unillustrated external system, for example. Non-limiting examples of the real-time surrounding environment data may include road congestion data, weather data, and various pieces of data regarding a place such as a parking lot. In this case, examples of the weather data may also include fog generation data, rainfall data, snowfall data, snow accumulation data, and temperature and humidity data regarding a region including the own vehicle position.

The road map DB 36b may hold, for example, data regarding various facilities and a place such as a parking lot. The road map DB 36b may output, to the controller 14, as the surrounding environment data, road map data on a range set with reference to the own vehicle position measured by the GNSS sensor 36a, for example, based on a request signal from the controller 14. In one embodiment, the road map DB 36b may thus serve, together with the GNSS sensor 36a, as the "surrounding environment recognition device". The road map DB 36b may, together with the GNSS sensor 36a, recognize a surrounding environment of the vehicle 1.

The in-vehicle radar device 37 may include multiple sensors, for example, multiple millimeter-wave radars. The millimeter-wave radars may output radio waves, and receive and analyze reflected waves from an object. The millimeter-wave radars may thus mainly detect a three-dimensional object such as a pedestrian or a vehicle traveling side by side, and an object such as a structure provided at a road edge, e.g., an edge of a road on a road shoulder side. Non-limiting examples of the structure may include a three-dimensional object such as a curbstone, a guard rail, a wall of a building, or a planting. The millimeter-wave radars may also detect, for example, a three-dimensional obstacle present on a road. In this case, the millimeter-wave radars may detect, as example of data regarding the three-dimensional object, a width of the three-dimensional object, a position, i.e., a relative position or a relative distance to the vehicle 1, of a representative point of the three-dimensional object, and a relative speed of the three-dimensional object.

The multiple sensors (e.g., the multiple millimeter-wave radars) included in the in-vehicle radar device 37 may be provided on, for example, right and left side parts of a front bumper, which are referred to as front right and left side sensors, and on right and left side parts of a rear bumper, which are referred to as rear right and left side sensors. The front right and left side sensors may detect, as the surrounding environment data, three-dimensional objects present in right and left obliquely frontward and sideward regions of the vehicle 1, which are difficult to recognize from the image obtained by the stereo camera 11. The rear right and left side sensors may detect, as the surrounding environment data, three-dimensional objects present in right and left obliquely sideward and rearward regions of the vehicle 1, which are difficult to recognize by the front right and left side sensors.

In one embodiment, the in-vehicle radar device 37 may thus serve as the "surrounding environment recognition device". The in-vehicle radar device 37 may recognize a surrounding environment of the vehicle 1. The information acquired by the sensors of the in-vehicle radar device 37 may be sent to the image recognizer 13 through the controller 14.

The rear sensor 38 may include, for example, a sonar device that measures a distance to a target or a shape of the target using ultrasonic waves. At least one rear sensor 38, or multiple rear sensors 38 may be provided on, for example, the rear bumper. The rear sensor 38 may detect, as the surrounding environment data, three-dimensional objects present in a rearward region of the vehicle 1, which are difficult to recognize by the rear right and left side sensors. In one embodiment, the rear sensor 38 may thus serve as the "surrounding environment recognition device". The rear sensor 38 may recognize a surrounding environment of the vehicle 1.

Coordinates of each target outside the vehicle, included in each of the pieces of surrounding environment data recognized by the components such as the image recognizer 13, the locator unit 36, the in-vehicle radar device 37, and the rear sensor 38 may be converted by the controller 14 into coordinates of a three-dimensional coordinate system having an origin at the center of the vehicle 1.

The vehicle speed detection device 39 may be a configuration unit or a circuit unit that detects a traveling speed of the vehicle 1 based on multiple wheel speed sensors and outputs of the multiple wheel speed sensors. The vehicle speed detection device 39 may detect a vehicle speed under the control of the controller 14.

In this case, the multiple wheel speed sensors included in the vehicle speed detection device 39 may detect pulse signals, i.e., wheel speed pulses generated in proportion to rotation numbers of the respective wheels, typically four wheels, of the vehicle. The vehicle speed detection device 39 may then detect a vehicle speed, for example, by averaging respective pieces of wheel speed data based on data on wheel rotational speeds of the respective wheels acquired by the multiple wheel speed sensors. The data on the vehicle speed detected by the vehicle speed detection device 39 may be outputted to the controller 14.

The controller 14 may execute the driving assistance control on the vehicle 1 based on the pieces of data acquired, for example, by the camera unit 10 and the various sensors, such as the locator unit 36, the in-vehicle radar device 37, the rear sensor 38, and the vehicle speed detection device 39.

The driving assistance control in this case may be a vehicle driving assistance control that is desired as appropriate. In the vehicle driving assistance control, for example, the controller 14 may use the E/G ECU 22 to perform an engine output control or a torque distribution control for each drive wheel, use the T/M ECU 23 to control the transmission to thereby control a forward or backward traveling direction, and use the BK ECU 24 to perform an individual braking control for each wheel.

Non-limiting examples of the various sensors to acquire the surrounding environment data may include, in addition to those described above, a light detection and ranging (LiDAR) device that measures a distance to a target or a shape of the target using a laser beam, a near-infrared sensor, and an ambient temperature sensor.

The above-described stereo camera 11 may cover a predetermined front field-of-view range as an observation target. Additionally, multiple camera devices of the same form may be provided that targets predetermined side and rear field-of-view ranges. This makes it possible to cover the entire surrounding range of the vehicle as an observation target.

Some or all of units including the image recognizer 13, the controller 14, the CP_ECU 21, the E/G_ECU 22, the T/M_ECU 23, the BK_ECU 24, the PS_ECU 25, and the DMS 31c may be configured by a processor including hardware.

The processor may be configured, for example, by: a known configuration including a central processing unit (CPU), a random access memory (RAM), a read only memory (ROM), a non-volatile memory, a non-volatile storage, and a non-transitory computer readable medium; and peripheral devices thereof.

The ROM, the non-volatile memory, and the non-volatile storage, for example, may store, in advance, fixed data such as software programs to be executed by the CPU or data tables. The CPU may read the software program stored in the ROM, for example, and develop and execute the program in the RAM. The software program may refer to various kinds of data as appropriate to thereby implement functions of the above-described constituting component and the constituting units, i.e., the image recognizer 13, the controller 14, CP_ECU 21, the E/G_ECU 22, the T/M_ECU 23, the BK_ECU 24, the PS_ECU 25, and the DMS 31c, for example.

In some embodiments, the processor may be configured by a semiconductor chip such as a field programmable gate array (FPGA). The above-described constituting component and the constituting units, i.e., the image recognizer 13, the controller 14, the CP_ECU 21, the E/G_ECU 22, the T/M_ECU 23, the BK_ECU 24, the PS_ECU 25, and the DMS 31c, for example, may be each configured by electronic circuitry.

A portion or the entirety of the software program may be recorded in a computer program product. Non-limiting examples of the computer program product may include a portable disc medium such as a flexible disk, a CD-ROM, or a DVD-ROM, or a non-transitory computer readable medium such as a card memory, a hard disk drive (HDD), or a solid state drive (SSD).

A description is given below of operations of the DMS 31c which is a non-limiting example of the occupant monitoring apparatus according to the example embodiment configured as described above.

First, the vehicle 1 mounted with the occupant monitoring apparatus, i.e., the DMS 31c according to the example embodiment may have multiple driving modes, and may be mounted with the driving assistance control device. The driving assistance control device may selectively execute multiple driving assistance controls or simultaneously execute some of the driving assistance controls. Such a configuration may allow the vehicle 1 to travel while executing one or more driving assistance controls selected by a driver in accordance with the multiple driving modes selected by the driver.

When the occupant monitoring apparatus, i.e., the DMS 31c is activated during traveling of the vehicle 1, the DMS 31c may set detection duration time depending on data on the vehicle speed the vehicle 1. As used herein, the "detection duration time" may refer to time used by the DMS 31c to detect a change in the behavior of the driver. When a predetermined change in the behavior is detected within the detection duration time, an alarm may be outputted. In this case, when one or more driving assistance controls are in execution, the DMS 31*c* may further set predetermined detection duration time corresponding to the type of the driving control that is in execution.

Figure 3:
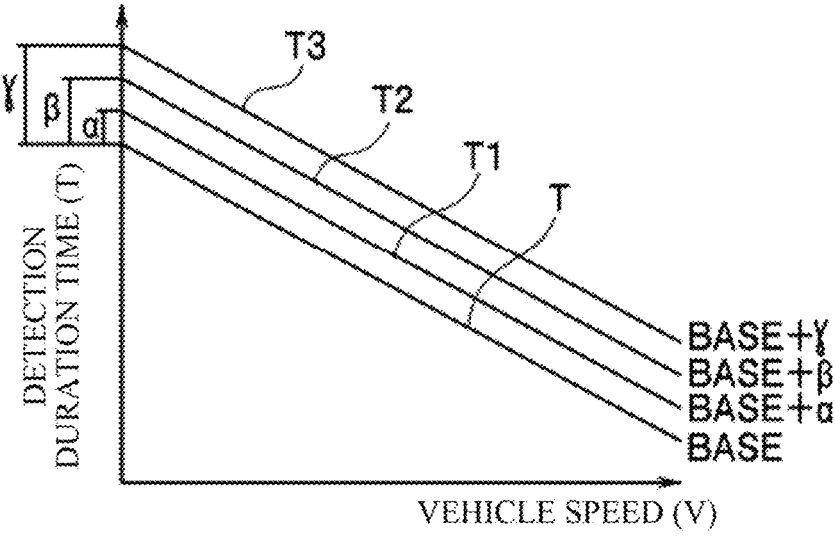
FIG. 3 is a graph conceptually illustrating a setting of detection duration time in the occupant monitoring apparatus illustrated in FIG. 1.

FIG. 3 is a graph conceptually illustrating a setting of the detection duration time in the occupant monitoring apparatus, i.e., the DMS 31*c* according to the example embodiment. As illustrated in FIG. 3, detection duration time (T) of the occupant monitoring apparatus, i.e., the DMS 31*c* may be basically set to be shorter as a vehicle speed (V) becomes faster. When the vehicle 1 is traveling in a state where no driving assistance control of the multiple driving assistance controls is executed in the manual driving mode, the DMS 31*c* may set the detection duration time (T) depending only on the vehicle speed (V). The graph illustrated as "BASE" in FIG. 3 indicates detection duration time at this time. In the following description, the detection duration time at this time is called reference detection duration time T.

In a normal case, a driver who drives the vehicle 1 in a state where no driving assistance control is executed keeps traveling the vehicle 1 while constantly monitoring surrounding circumstances. The time detected by the DMS 31*c* at this time may be set as a reference, which detection time is referred to as the reference detection duration time T.

When the vehicle 1 is traveling in a state where one of the first to third driving assistance controls of the multiple driving assistance controls is executed in the assisted driving mode, the DMS 31*c* may set the detection duration time (T) depending on the type of the driving assistance control that is in execution, in addition to the vehicle speed (V).

In FIG. 3, the graph illustrated as "BASE+α" is first detection duration time T1 at the time when the vehicle 1 is traveling in a state where only the first driving assistance control is executed. As used herein, the symbol α may denote first time added to the reference detection duration time T.

In a normal case, a driver who drives the vehicle 1 in which only the first driving assistance control is in execution involves monitoring of mainly front surrounding circumstances, such as a preceding vehicle. Taking this into account, a change in the behavior of the driver for the monitoring of the front surrounding circumstances during the execution of the first driving assistance control may be presumed to be a behavior made by the driver on his or her own will. The first detection duration time T1 may be set, with the first time α being added as the time desired for that purpose.

In FIG. 3, the graph illustrated as "BASE+β" is second detection duration time T2 at the time when the vehicle 1 is traveling in a state where the second driving assistance control is executed. As used herein, the symbol β may denote second time added to the reference detection duration time T.

In a normal case, a driver who drives the vehicle 1 in which the second driving assistance control is in execution involves monitoring of mainly front and right and left surrounding circumstances, such as a preceding vehicle and right and left lane lines. Taking this into account, a change in the behavior of the driver for the monitoring of the front and right and left surrounding circumstances during the execution of the second driving assistance control may be presumed to be a behavior made by the driver on his or her own will. The second detection duration time T2 may be set, with the second time β being added as the time desired for that purpose.

In FIG. 3, the graph illustrated as "BASE+γ" is third detection duration time T3 at the time when the vehicle 1 is traveling in a state where the third driving assistance control is executed. As used herein, the symbol γ may denote third time added to the reference detection duration time T.

In a normal case, a driver who drives the vehicle 1 in which the third driving assistance control is in execution involves monitoring of mainly rear surrounding circumstances in addition to the front and right and left surrounding circumstances, such as a preceding vehicle, right and left lane lines, and subsequent vehicles on an own vehicle lane and adjacent vehicle lanes. Taking this into account, a change in the behavior of the driver for the monitoring of the front, right and left, and rear surrounding circumstances during the execution of the third driving assistance control may be presumed to be a behavior made by the driver on his or her own will. The third detection duration time T3 may be set, with the third time γ being added as the time desired for that purpose.

Note that the first time α, the second time β, and the third time γ may be set to have a relationship of "$\alpha \leq \beta \leq \gamma$". That is, the first time α may be set equal to or less than the second time β. The second time β may be set equal to or more than the first time α, and may be set equal to or less than the third time γ. The third time γ may be set equal to or more than the second time β.

Accordingly, the reference detection duration time T may be set to time shorter than the first detection duration time T1. The first detection duration time T1 may be set to time shorter than the second detection duration time T2. The second detection duration time T2 may be set to time shorter than the third detection duration time T3.

Figure 4:
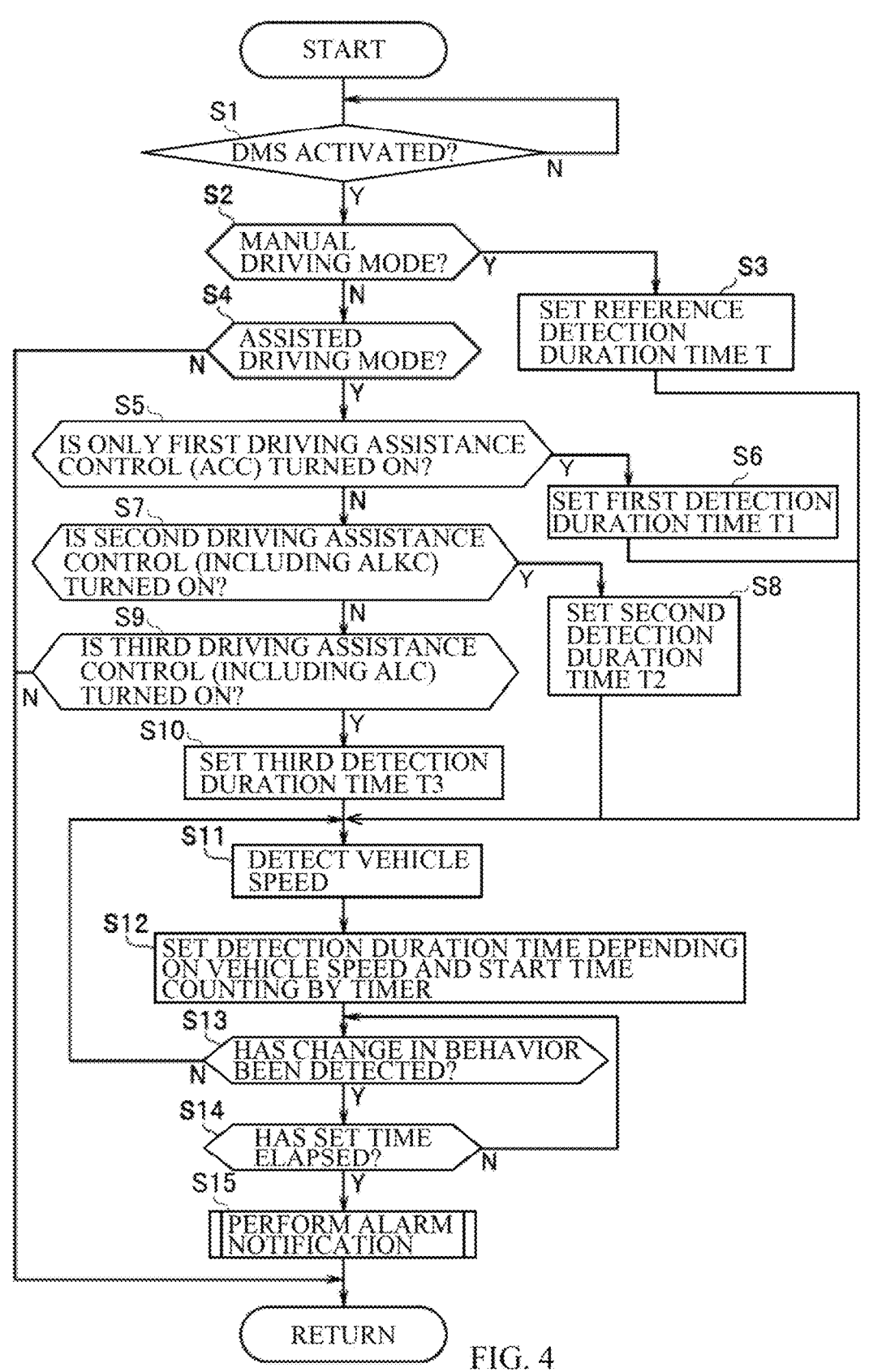
FIG. 4 is a flowchart illustrating operations of the occupant monitoring apparatus illustrated in FIG. 1.

FIG. 4 is a flowchart illustrating operations of the occupant monitoring apparatus, i.e., the DMS 31*c* according to the first example embodiment of the disclosure. Hereinafter, a description is given, with reference to the flowchart of FIG. 4, of the operations of the occupant monitoring apparatus, i.e., the DMS 31*c* according to the example embodiment.

In step S1 of FIG. 4, the controller 14 may confirm whether the DMS 31*c* is activated. If it is determined that the DMS 31*c* is activated ("Y" in step S1), the flow may proceed to the next processing of step S2. If the DMS 31*c* is not activated ("N" in step S), the processing may be repeated. That is, in the flowchart, the activation of the DMS 31*c* may be used as a trigger.

In step S2, the controller 14 may determine whether the driving mode in the driving assistance control device is set to the manual driving mode. If it is determined that the manual driving mode is set ("Y" in step S2), the flow may proceed to processing of step S3. In this case, setting information on the driving mode may be communicated from the controller 14 to the DMS_ECU 42 of the DMS 31*c* through the CP_ECU 21. If a mode other than the manual driving mode is set ("N" in step 2), the flow may proceed to processing of step S4.

In step S3, the DMS_ECU 42 may set the reference detection duration time T.

In step S4, the controller 14 may determine whether the driving mode in the driving assistance control device is set to the assisted driving mode. If it is determined that the assisted driving mode is set ("Y" in step S4), the flow may proceed to processing of step S5. In this case, the setting information on the driving mode may be communicated from the controller 14 to the DMS_ECU 42 of the DMS 31*c* through the CP_ECU 21. If a mode other than the assisted driving mode is set, i.e., if the automated driving mode is set ("N" in step S4), a series of processing may be ended (return).

The vehicle 1 mounted with the occupant monitoring apparatus, i.e., the DMS 31*c* according to the example embodiment may not allow the DMS 31*c* to monitor occupants when setting the automated driving mode to drive the vehicle 1. Accordingly, in this flowchart, when the automated driving mode is set, the flow may transfer to unillustrated another control processing corresponding to the automated driving mode, for example, after the series of processing is ended.

In step S5, the controller 14 may determine the type of the set driving assistance control. If only the first driving assistance control is set ("Y" in step S5), the flow may proceed to processing of step S6. In this case, the setting information on the driving assistance control may be communicated from the controller 14 to the DMS_ECU 42 of the DMS 31*c* through the CP_ECU 21. If multiple driving assistance controls are set, which may include the first driving assistance control ("N" in step S5), the flow may proceed to processing of step S7.

In step S6, the DMS_ECU 42 may set the first detection duration time T1.

In step S7, the controller 14 may determine the type of the set driving assistance control. If a setting is made to include the second driving assistance control ("Y" in step S7), the flow may proceed to processing of step S8. In this case, the setting information on the driving assistance control may be communicated from the controller 14 to the DMS_ECU 42 of the DMS 31*c* through the CP_ECU 21. If a driving assistance control other than the second driving assistance control is set, which may be multiple driving assistance controls ("N" in step S7), the flow may proceed to processing of step S9.

In step S8, the DMS_ECU 42 may set the second detection duration time T2.

In step S9, the controller 14 may determine the type of the set driving assistance control. If a setting is made to include the third driving assistance control ("Y" in step S9), the flow may proceed to processing of step S10. In this case, the setting information on the driving assistance control may be communicated from the controller 14 to the DMS_ECU 42 of the DMS 31*c* through the CP_ECU 21. If a driving assistance control other than the third driving assistance control is set, which may be multiple driving assistance controls ("N" in step S9), the series of processing may be ended (return).

The driving assistance control device according to the example embodiment exemplifies the first to third driving assistance controls as the multiple driving assistance controls. However, the driving assistance control that may be executed by the driving assistance control device is not limited to the above-described three types of driving assistance controls. Another driving assistance control may be adopted. In the other driving assistance control in the example embodiment, the flow may transfer to unillustrated control processing corresponding to the other driving assistance control after the series of processing is ended.

In step S10, the DMS_ECU 42 may set the third detection duration time T3.

In step S11, the controller 14 may control the vehicle speed detection device 39 to detect current vehicle speed data. The vehicle speed data inputted to the controller 14 from the vehicle speed detection device 39 may be further outputted to the DMS_ECU 42 of the DMS 31*c* through the CP_ECU 21; refer to the symbol [Vdata] in FIG. 2.

In response to the output of the vehicle speed data, the DMS_ECU 42, in step S12, may set detection duration time corresponding to the vehicle speed for one of the reference detection duration time T or the first detection duration time T1 to the third detection duration time T3 set in the above-described respective steps S3, S6, S8, and S10, as illustrated in FIG. 3. At the same time, the DMS_ECU 42 may start time counting by a timer using an unillustrated internal clock, for example.

Thereafter, in step S13, the DMS_ECU 42 may determine whether a change in the behavior of the driver has been detected.

In step S14, the DMS_ECU 42 may determine whether the detection duration time set in the above-described processing of step S12 has elapsed. If it is determined that the set time has elapsed ("Y" in step S14), the flow may proceed to processing of step S15. If the set time has not elapsed ("N" in step S14), the flow may return to processing of step S13.

In step S15, the DMS_ECU 42 may execute predetermined alarm notification processing. The predetermined alarm notification processing performed in step S15 may be the following processing.

First, the alarm outputter 42*b* may output a predetermined alarm information signal to the notifier 31*d* based on a result of the detection made by the behavior change detector 42*a*. In response to the output of the predetermined alarm information signal, the notifier 31*d* may perform alarm notification in a predetermined form, i.e., by visual or auditory indication. Thereafter, the series of processing may be ended (return).

As described above, according to the above-described first example embodiment, when the driving assistance control is not executed, the DMS 31*c* may perform detection using the reference detection duration time T. At that time, the DMS 31*c* may set the reference detection duration time T depending on the vehicle speed.

When one or more driving assistance controls of the multiple driving assistance controls are in execution, the DMS 31*c* may set detection duration time depending on the driving assistance control that is in execution, and may set detection duration time depending on the vehicle speed.

In one example, during execution of only the first driving assistance control, the first detection duration time T1 may be set, with the first time α being added to the reference detection duration time T. During execution of the driving assistance control including the second driving assistance control, the second detection duration time T2 may be set, with the second time β being added to the reference detection duration time T. During execution of the driving assistance control including the third driving assistance control, the third detection duration time T3 may be set, with the third time γ being added to the reference detection duration time T.

The DMS 31*c* according to the example embodiment may perform such a setting control, which helps to suppress frequent issuance of an unnecessary alarm during traveling of the vehicle. This suppresses an influence to be imposed on the driver, thus helping to contribute to improved safety during traveling of the vehicle.

Incidentally, the third driving assistance control of the above-described multiple driving assistance controls may perform the acceleration and deceleration controls and the steering control at a steering angle equal to or larger than a predetermined steering angle, and may be the auto lane changing control (ALC) in one example.

The third driving assistance control may be an auto lane changing control that is started in response to an ON signal of a direction indicator. In one example, the third driving assistance control may be a control that is started at a timing when the DMS_ECU 42 of the DMS 31*c* receives a lane change command signal as the ON signal. The lane change command signal may be outputted by the driver operating the direction indicator lever 31*b* as the direction indicator.

In a normal case, the driver visually confirms surrounding circumstances in a front-rear direction on an adjacent vehicle lane on a side to which lane changing is desired, after having operated the direction indicator lever 31*b* in a desired direction to change lanes. For example, the driver visually confirms the side and the rear of the vehicle 1. At this time, the behavior and the posture including the facial direction and the line-of-sight direction of the driver significantly change as compared with the normal posture during the time when the driver drives the vehicle while facing the forward direction.

In this case, if a direction of the change in the behavior and the posture, which is detected by the DMS 31*c*, after issuance of the lane change command signal coincides with the desired lane changing direction, the changed behavior may be presumed to be a behavior that is desired for the third driving assistance control. Accordingly, in this case, the DMS 31*c* may not output alarm notification information.

However, if the direction of the change in the behavior and the posture, which is detected by the DMS 31*c*, after the issuance of the lane change command signal do not coincide with the desired lane changing direction, the behavior of the driver may be presumed to be a behavior that is obviously not related to the third driving assistance control. Accordingly, in this case, it is sufficient for the DMS 31*c* to early output alarm notification information.

A description is given below briefly, with reference to FIG. 5, of operations of an occupant monitoring apparatus according to a second example embodiment of the disclosure in consideration of those described above. A configuration of the occupant monitoring apparatus according to the second example embodiment is similar to that of the above-described first example embodiment. In the example embodiment, some of the operations of the DMS 31*c*, i.e., some of the processing sequences differ slightly.

FIG. 5 is a flowchart illustrating some of the operation of the occupant monitoring apparatus according to the second example embodiment of the disclosure. Basically, the operations of the occupant monitoring apparatus according to the example embodiment are substantially similar to those of the above-described first example embodiment. Accordingly, in the flowchart of FIG. 5, the same processing steps as those of the flowchart of the above-described first example embodiment, as illustrated in FIG. 4, are denoted by the same step numbers, and the descriptions thereof are omitted. In FIG. 5, some of illustrations for the same processing steps as those in FIG. 4 are omitted. Hereinafter, a description is given, with reference to FIG. 5, of the operations of the occupant monitoring apparatus according to the example embodiment, for components that are different from those of the first example embodiment.

Processing of each of steps S11, S12, and S13 of FIG. 5 may be the same as that in the above-described first example embodiment.

If the behavior change detector 42*a* of the DMS_ECU 42 detects a change in the behavior in the processing of step S13 ("Y" in step S13), the flow may next proceed to step S13A.

In step S13A of FIG. 5, the DMS_ECU 42 may determine whether a lane change command signal issued by an operation of the direction indicator lever 31*b* has been detected. The DMS_ECU 42 may be able to confirm that the direction indicator lever 31*b* has been operated by detection of the lane change command signal. In this case, the lane change command signal may also include data regarding a direction in which the direction indicator lever 31*b* is operated, i.e., a lane changing direction desired by the driver.

If the lane change command signal including lane changing direction data is confirmed ("Y" in step S13A), the flow may proceed to processing of step S13B. If the lane change command signal is not confirmed ("N" in step S13A), the flow may proceed to processing of step S14.

In step S13B, the DMS_ECU 42 may determine whether detection data, for example, on facial direction detected by the above-described processing of step S13 and a direction indicated by the direction indicator lever 31*b*, i.e., a desired lane changing direction, in the above-described processing of step S13A coincide with each other. If it is determined that the facial direction, for example, and the desired lane changing direction coincide with each other ("Y" in step S13B), the flow may proceed to processing of step S14. In this case, the setting of the third detection duration time T3 may be maintained. If the facial direction, for example, and the desired lane changing direction do not coincide with each other ("N" in step S13B), the flow may proceed to processing of step S13C.

In step S13C, the DMS_ECU 42 may set the reference detection duration time T. Thereafter, the flow may proceed to the processing of step S14. The following pieces of processing are exactly similar to those of the above-described first example embodiment.

As described above, according to the second example embodiment, it is possible to obtain the effects substantially similar to those of the above-described first example embodiment. Further, according to the example embodiment, upon starting the third driving assistance control, if the facial direction and the desired lane changing direction coincide with each other, for example, as for the behavior of the driver detected by the behavior change detector 42*a* of the DMS_ECU 42, the setting of the third detection duration time T3 may be maintained. If the facial direction and the desired lane changing direction do not coincide with each other, switching may be made to the setting of the reference detection duration time T.

Accordingly, performing such a control makes it possible to further suppress the issuance of an unnecessary alarm during the execution of the third driving assistance control.

The disclosure is not limited to the foregoing example embodiments, and various modifications or applications may be made without departing from the scope of the disclosure. Further, the foregoing example embodiments each include sub-combinations of the disclosure, and various technologies may be extracted by appropriately combining the elements of the disclosure described herein. For example, when the above-described concerns may be addressed and at least one of the above-described example effects may be obtained even if one or more elements are deleted from all the elements disclosed herein, the remaining elements may be extracted as a technology. Furthermore, any of various elements in the foregoing example embodiments may be combined as appropriate. The disclosure is defined by the appended claims but is not limited by any particular example embodiment.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The DMS_ECU 42 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the DMS_ECU 42. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the DMS_ECU 42 illustrated in FIG. 2.

The invention claimed is:

1. An occupant monitoring apparatus for a vehicle, the occupant monitoring apparatus comprising:
    an imager configured to acquire an image of a driver who drives the vehicle; and
    an occupant monitoring controller comprising control circuitry including behavior change detection circuitry and alarm output circuitry,
        the behavior change detection circuitry being configured to detect a change in a behavior of the driver based on the image acquired by the imager,
        the alarm output circuitry being configured to output predetermined alarm information based on a result of the detection performed by the behavior change detection circuitry, wherein
    the behavior change detection circuitry is configured to set a detection duration time for detecting the change in the behavior of the driver, depending on a traveling speed of the vehicle and a type of a driving assistance control that is in execution of the vehicle.

2. The occupant monitoring apparatus for the vehicle according to claim 1, wherein the type of the driving assistance control comprises:
    a first driving assistance control configured to perform acceleration and deceleration controls;

a second driving assistance control configured to perform the acceleration and deceleration controls and a steering control at a steering angle smaller than a predetermined steering angle; and
    a third driving assistance control configured to perform the acceleration and deceleration controls and a steering control at a steering angle equal to or larger than the predetermined steering angle.

3. The occupant monitoring apparatus for the vehicle according to claim 2, wherein the behavior change detection circuitry is configured to:
    perform the detection based on a reference detection duration time when none of the first driving assistance control, the second driving assistance control, and the third driving assistance control is executed, the reference detection duration time being set depending on the traveling speed of the vehicle;
    perform the detection based on a first detection duration time when the first driving assistance control is in execution, the first detection duration time being the reference detection duration time plus first time;
    perform the detection based on a second detection duration time when the second driving assistance control is in execution, the second detection duration time being the reference detection duration time plus second time; and
    perform the detection based on a third detection duration time when the third driving assistance control is in execution, the third detection duration time being the reference detection duration time plus third time.

4. The occupant monitoring apparatus for the vehicle according to claim 3, wherein
    the first time is equal to or less than the second time,
    the second time is equal to or more than the first time and equal to or less than the third time,
    the third time is equal to or more than the second time,
    the reference detection duration time is shorter than the first detection duration time,
    the first detection duration time is shorter than the second detection duration time, and
    the second detection duration time is shorter than the third detection duration time.

5. The occupant monitoring apparatus for the vehicle according to claim 3, wherein
    the third driving assistance control comprises an auto lane changing control that is to be started upon reception of an ON signal of a direction indicator, and
    the behavior change detection circuitry, during the execution of the third driving assistance control, is configured to:
        perform the detection based on the third detection duration time when a facial direction of the driver and a direction indicated by the direction indicator coincide with each other; and
        perform the detection based on the reference detection duration time when the facial direction of the driver and the direction indicated by the direction indicator do not coincide with each other.

6. The occupant monitoring apparatus for the vehicle according to claim 1, wherein the behavior change detection circuitry is configured to:
    start time counting by a timer when the detection duration time is set, and
    determine, based on the time counting by the timer, whether the detection duration time has elapsed.

7. The occupant monitoring apparatus for the vehicle according to claim 1, wherein the behavior change detection circuitry is configured to set the detection duration time depending only on the traveling speed of the vehicle when the vehicle is traveling in a manual driving mode and no driving assistance control is executed.

8. An occupant monitoring apparatus for a vehicle, the occupant monitoring apparatus comprising circuitry configured to;

acquire an image of a driver who drives the vehicle;

detect a change in a behavior of the driver based on the acquired image;

output predetermined alarm information based on a result of the detection of the change in the behavior, and set, upon the detection of the change in the behavior, a detection duration time for detecting the change in the behavior of the driver, depending on a traveling speed of the vehicle and a type of a driving assistance control that is in execution of the vehicle.

9. An occupant monitoring apparatus for a vehicle, the occupant monitoring apparatus comprising:

an imager configured to acquire an image of a driver who drives the vehicle; and an occupant monitoring controller comprising control circuitry including:

(i) behavior-change-detection circuitry configured to detect a change in a behavior of the driver based on the image acquired by the imager; and (ii) alarm-output circuitry configured to output predetermined alarm information based on a result of the detection, wherein the behavior-change-detection circuitry is configured to:

determine a reference detection duration time that varies depending on a traveling speed of the vehicle; and

set a detection duration time for detecting the change in the behavior of the driver, the detection duration time being selected from a first detection duration time, a second detection duration time, and a third detection duration time depending on which one of a first driving assistance control, a second driving assistance control, or a third driving assistance control is in execution, wherein:

the first driving assistance control performs acceleration and deceleration controls, the second driving assistance control performs the acceleration and deceleration controls and a steering control at a steering angle smaller than a predetermined steering angle, the third driving assistance control performs the acceleration and deceleration controls and a steering control at a steering angle equal to or greater than the predetermined steering angle, and wherein:

the first detection duration time is the reference detection duration time plus a first time, the second detection duration time is the reference detection duration time plus a second time, the third detection duration time is the reference detection duration time plus a third time, and the first time, the second time, and the third time satisfy a relationship in which the first time is equal to or less than the second time, and the second time is equal to or less than the third time.

* * * * *